June 24, 1969     J. A. BENDER     3,451,330

DRIP COFFEE MAKER

Filed May 13, 1966

INVENTOR.
JOSEPH A. BENDER

BY *James and Franklin*

ATTORNEYS

United States Patent Office 3,451,330
Patented June 24, 1969

3,451,330
DRIP COFFEE MAKER
Joseph A. Bender, Springfield, N.J., assignor to Vacuum Die Casting Corporation, Newark, N.J., a corporation of Ohio
Filed May 13, 1966, Ser. No. 549,899
Int. Cl. A47j 31/04
U.S. Cl. 99—299          14 Claims

ABSTRACT OF THE DISCLOSURE

A drip coffee maker as in Patent 3,333,528 comprises a reservoir for hot water, a coffee server, a coffee basket therebetween, and a spreader, the reservoir having a riser tube and also a flow discharge hole which flows hot water at a desired controlled rate to obtain a desired infusion time. The flow discharge rate is found to be undesirably and unpredictably changed by the presence of a whirlpool in the reservoir, and in the present improvement the riser tube is offset from the center of the reservoir, and is also provided with a vane mounted thereon, to inhibit the formation of a whirlpool. The spreader has a hollow handle located at the center of the spreader and acting as a vent. The basket has a post rising from its bottom, with the upper end of the post nearly filling the hollow handle, but leaving a thin annular vent passage, which passage is readily cleaned on separation of the spreader from the post.

---

This invention relates to coffee makers, and more particularly to coffee makers of the drip type.

In my copending application Ser. No. 418,210, filed Dec. 14, 1964, since issued on Aug. 1, 1967 as Patent No. 3,333,964 I disclose a drip coffee maker which satisfies the basic rules of good brewing practice. More specifically, it provides a flow rate from the reservoir which is independent of the flow rate through the coffee bed; it distributes water over the basket to avoid channeling; it confines the coffee grounds to prevent floating particles from entering the finished brew; and it disposes of excess hot water which is not capable of going through the spreader and basket within the desired brewing time, the excess water being bypassed directly to the brew receiver. The basket is provided with a spreader; the basket is dimensioned to have a volume of from 1.6 to 2.5 times the volume of the maximum dry coffee charge; the spreader is locked in the basket; and the basket and spreader combination are vented for release of gases.

The coffee maker then comprises a reservoir to supply hot water; a basket and spreader of appropriate design to contain the ground coffee; a server to receive the brew; and means to so control the rate of flow of hot water from the reservoir that the extraction time is correct independently of the ability of the basket to accept all of the water. The flow time is determined by a flow control orifice, and takes into account the time required for drainage of the basket.

In another copending application Ser. No. 418,175, filed Dec. 14, 1964, since issued on Aug. 1, 1967 as Patent No. 3,333,528 I provide a manually removable stopper to stopper the flow discharge hole from the reservoir. I also arrange for the brewing of a wide range of quantity, say from one-third of maximum to maximum (e.g. three to nine cups), while limiting the extraction time despite the wide range in quantity. This is done by the provision of an additional flow passage located at higher level in the reservoir, and which therefore is effective to accelerate the flow for larger quantities of water.

I have found that the water in the reservoir may develop a whirlpool action as it drains, and that this may change the discharge time. A further object is to provide means to inhibit the formation of a whirlpool.

Another object is to provide the spreader with a hollow heat-insulating handle of large diameter which acts also as a vent. An ancillary object is to provide a center post in the basket which nearly fills the hollow handle, but leaves a thin annular vent passage therebetween. This passage, although thin, is readily cleaned on separation of the spreader from the basket.

Still another object is to improve the construction of the water distribution holes which are distributed over the surface of the spreader, by using displaced slit metal, instead of pierced metal.

To accomplish the foregoing objects, and others which will hereinafter appear, my invention resides in the drip coffee maker elements and their relation one to another as are hereinafter more particularly described in the following specification. The specification is accomplished by drawings in which.

Figure 1:
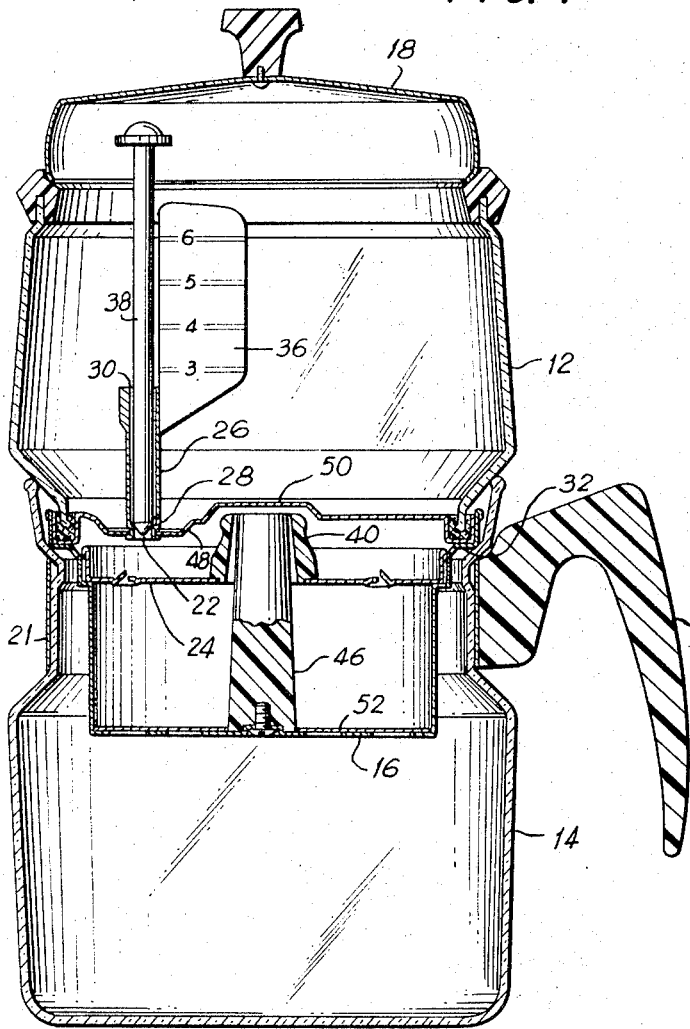
FIG. 1 is a vertical section through a coffee maker embodying features of the invention.

Referring to FIG. 1, the coffee maker comprises a reservoir 12 having a glass side wall, disposed over a glass coffee server 14, with a metal coffee basket 16 therebetween. The bottom of the reservoir is made of metal. The glass is secured in a peripheral metal channel by means of an epoxy material. The metal cover 18 may be used on either the reservoir 12 or the server 14. Handle 20 may be secured by a metal ring 21 around the neck of the server.

There is a flow discharge hole 22 located over a spreader 24 mounted on basket 16, and hole 22 is formed at the lower end of a riser tube 26. This has a flow control orifice 28 near the bottom of the reservoir, and an additional flow passage 30, most simply the open top end of tube 26, located at a higher level, a little below one-half maximum capacity. This accelerates the flow for larger quantities.

Figure 2:
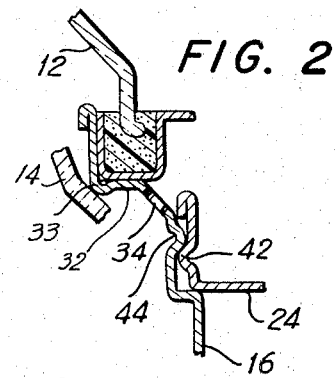
FIG. 2 is a fragmentary vertical section drawn to larger scale and taken at the periphery of the spreader and basket.

The basket 16 is formed integrally with its annnular support ring 32 (FIG. 2), and the latter has a ring of overflow holes 34 (FIG. 2) outside the spreader 24 and the basket 16. There is a scale 36 (FIG. 1) to indicate the quantity of hot water poured into the reservoir, and a valve rod 38 which may be inserted in tube 26 to close the flow discharge hole 22.

Assuming the coffee is drip ground, the optimum operating time is from five to seven minutes, including an allowance for residual basket drain time and drip time. The main basket drain time is about a half minute, but it increases when using softened water, as is common in the southwest and western parts of the United States. The drain time may increase to a maximum of one and one-half minutes. This main drain is followed by a final drip which is slow but accomplishes only reduced extraction because the liquid level is lower than the coffee level. The optimum extraction time referred to herein is that which removes 18% to 22% by weight from the ground coffee.

The brewed coffee is not weakened by the bypass overflow because the percentage of solids extracted from the ground coffee is a function of time. When the quantity of hot water is increased, the amount of coffee grounds put in the basket is correspondingly increased, and therefore the amount of solids extracted is commensurately increased for the same extraction time. The bypassed water therefore merely restores the orignially desired percentage content of solids.

The use of the discharge hole 22 as a flow rate control orifice is feasible when dealing with a relatively fixed quantity or limited range of brew, but not when the coffee maker is to be used over a wide range, say three to six cups, because the flow time cannot be kept within desired limits for both the minimum and the maximum quantities of hot water.

In the present case the discharge hole 22 is made relatively large, and serves only as a discharge hole, and not as a flow rate control orifice. The smaller orifice 28 in the side of tube 26 at the bottom of the reservoir, is effective to properly control the flow rate for smaller quantities of water, say one-half maximum capacity. An additional passage, in this case the top 30 of tube 26, is located at a higher level, and is effective to accelerate the flow through hole 22 for larger quantities of water, say from one-half to maximum quantity.

One feature of the present coffee maker is the provision of an anti-whirlpool means. I have found that the discharge time may be changed if for any reason the water in the reservoir forms a whirlpool. To inhibit the formation of such a whirlpool, a fin or vane is provided at 36, this being mounted radially on the riser tube. The parts 26 and 36 may be made of metal and brazed together, and the vane 36 carries the scale marked in numbers of cups, in this case from three to six cups.

Another feature of the present coffee maker is that the spreader 24 is provided with a large diameter heat insulating hollow handle 40. This handle is preferably made of a non-metallic material, preferably a moldable plastic, such as Celcon or Nylon. It is large enough in diameter to be conveniently handled and to rotate the spreader 24 to lock or unlock it in the basket, it being understood that the rim of the spreader preferably has short outwardly struck helical beads 42 (FIG. 2) and the basket 16 has mating inwardly struck short beads 44, forming an interrupted thread, so that the parts may be assembled by inserting and rotating the spreader to engage the beads.

The hollow handle 40 (FIG. 1) acts as a vent for the basket. However, to prevent overflow of coffee grounds floating on froth or foam formed as the hot water flows through the coffee bed, the bottom of the basket may be provided with a center post 46 projecting upward into the hollow handle 40. The relative dimensions are such as to leave a thin annular vent passage which stops the grounds, yet the parts are readily cleaned when the spreader is disassembled from the basket. The post 46 and the valve rod 38 may be made of the same material as the handle 40. The ring 32 (FIG. 2) has three small bumps or dots 33 which space it from the server 14 for venting.

Inasmuch as the handle 40 is preferably located at the center of the spreader 24, the flow discharge hole 22 is preferably offset from the center. The tube 26, the vane 36, and the valve rod 28 are all shown displaced sideward from the axis of the coffee maker. The discharge hole 22 preferably is located in a slight depression or sump 48 to insure full drainage. The bottom of the reservoir preferably is displaced upward somewhat as indicated at 50 to insure clearance over the top of the handle 40, while minimizing the overall height of the coffee maker. The parts 48 and 50 are offset, as shown.

The bottom of basket 16 may have a large number of small holes, or it may receive a filter paper disk 52 supported on a bottom which is skeletonized or provided with large holes. The filter 52 has a center hole which mates with the post 46, and the latter serves importantly as a guide to center the filter paper as it descends to the bottom of the basket.

Figure 3:
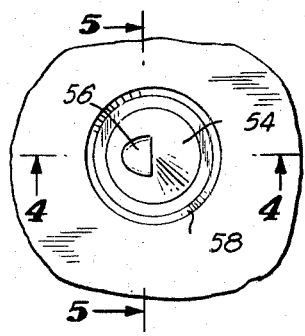
FIG. 3 is a fragmentary plan view drawn to enlarged scale and showing one of the apertured dimples in the spreader.
Figure 4:
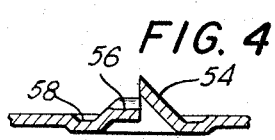
FIG. 4 is a section taken on the line 4—4 of FIG. 3.
Figure 5:
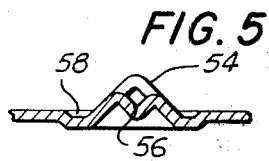
FIG. 5 is a section taken on the line 5—5 of FIG. 3.

The spreader 24 has a large number of apertured dimples distributed over its surface to spread the hot water over the coffee bed. The flow of water is aided by indenting part of the dimple to form a slit instead of a pierced hole, as is shown in FIGS. 3, 4, and 5. The metal is displaced upward at 54, as part of the dimple, and is displaced downward at 56, leaving a space therebetween through which water flows to the underside. This construction minimizes the effect of surface tension of the water, which normally tends to prevent it from passing through a small opening. The holes are tiny to prevent upward passage of coffee grounds of the intended size. With a pierced hole the water has a tendency to bridge across the top of the small opening, whereas with the present construction it tends to seep down by capillary action and wets the bottom of the dimple. Its spread is limited by the depression 58, which defines the bottom of the dimple, and the water flows readily until the spreader is drained, even though the openings are tiny. This construction has been found to be even better than that shown in my prior patent applications.

Figure 6:
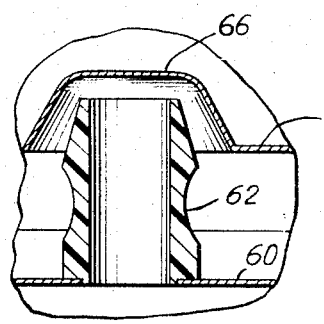
FIG. 6 is a fragmentary vertical section located at the spreader handle portion of FIG. 1, but showing a modified handle used without a basket post.

It is not necessary to use the guidepost 46, but if the post is omitted, the hollow handle 40 preferably is raised to greater height in order to prevent possible overflow of coffee grounds. Such a construction is shown in FIG. 6 in which spreader 60 has a hollow handle 62, much as in FIG. 1, except that the handle is of increased height. The basket has no guidepost. The bottom 64 of the reservoir is appropriately raised to increased height as shown at 66, in order to clear the top of the handle 62. The part 66 is offset from a sump like that shown at 48 in FIG. 1, for a riser tube and vane etc.

In the particular coffee maker shown in FIG. 1 the capacity is from three to six cups, and it is designed for use with drip grind coffee. The average diameter of the reservoir is 5.125 inches; the flow control orifice has a diameter of 0.089 inch; and the top of the tube is just below the three cup level. The coffee basket has a diameter of 3.856 inches and a height of 1.625 inches below the spreader. The post has a diameter of ¾ inch. This gives a coffee bed about ⅞ inch in height for six cups, and I have found one inch to be a desirable maximum coffee bed height for drip grind coffee. (Differently expressed, for a larger quantity of coffee the basket preferably would be increased in diameter in order to limit the height of the coffee bed.) The spreader has twenty-four holes, and these are large enough to flood the coffee grounds. They are designed to take the minimum quantity of water, in this case three cups, without overflow in the absence of coffee in the basket.

It will be understood that the foregoing dimensions are given solely by way of example, and are not intended to limit the scope of the invention. It will also be understood that while I have shown a reservoir and server made of glass these may equally well be made of metal, as shown in my prior applications above referred to. Instead of being manually operated the valve may be automatically opened after a suitable delay, as described in my copending application Ser. No. 418,211, filed Dec. 14, 1964 since issued on Aug. 1, 1967 as Patent No. 3,333,-527. The water may be electrically heated in the reservoir, instead of using previously heater water.

It is believed that the construction and operation of my improved coffee maker, as well as the advantages thereof, will be understood from the foregoing detailed description. It will be understood that while I have shown and described the invention in a preferred form, changes may be made without departing from the scope of the invention, as sought to be defined in the following claims.

I claim:

1. A drip coffee maker comprising a reservoir for hot water, a coffee server, a coffee basket between the source and the server, a support for said basket, a spreader in said basket, said source having a flow discharge hole serving to flow hot water at a desired rate onto the spreader to obtain a desired infusion time, said infusion time being undesirably and unpredictably changed by the presence of a whirlpool in the reservoir, said support and basket being so shaped and designed as to afford overflow of excess hot water directly to the server without passing through the spreader and the coffee grounds in the basket, and said reservoir being provided with means having obstructive surfaces offset from the axis of a potential whirlpool and effective to inhibit the maintenance of a whirlpool in the reservoir.

2. A coffee maker as defined in claim 1 in which the said whirlpool inhibiting means is a vane disposed radially relative to the flow discharge hole.

3. A coffee maker as defined in claim 2 in which the vane carries a measuring scale to indicate the quantity of water in the reservoir.

4. A coffee maker as defined in claim 1, in which the reservoir has a full bottom except for a relatively large flow discharge hole over the spreader, and has a riser tube from said bottom around the flow discharge hole, and has a flow control orifice which orifice is effective for small quantities of water, and has an additional flow passage into the tube at a higher level which is effective to accelerate the flow for larger quantities of water, and has an anti-whirlpool vane mounted at the riser tube.

5. A coffee maker as defined in claim 1 in which the spreader has a hollow handle of relatively large diameter which acts as a vent, and in which the flow discharge hole is offset from the center of the spreader, and in which the hollow handle of the spreader is located at the center of the spreader.

6. A coffee maker as defined in claim 5 in which the bottom of the reservoir is raised at the spreader handle to clear the top of the spreader handle.

7. A coffee maker as defined in claim 5 in which the basket has a post rising from its bottom, with the upper end of the post nearly filling the hollow handle but leaving a thin annular vent passage between the post and handle, said passage being readily cleaner on separation of the spreader from the basket.

8. A coffee maker as defined in claim 5 in which the hollow handle is high enough to prevent overflow of coffee grounds while the hot water is passing through the coffee in the basket.

9. A coffee maker as defined in claim 5 in which the spreader has a large number of dimples distributed over its surface, and in which each dimple has a slit instead of a pierced hole, with the metal displaced downward at one side of the slit, relatively to the other side, to form a small hole for passage of water.

10. A coffee maker as defined in claim 1, in which the reservoir has a full bottom except for a relatively large flow discharge hole, and has a riser tube from said bottom around the flow discharge hole, and has a flow control orifice which is effective for small quantities of water, and has an additional flow passage into the tube at a higher level which is effective to accelerate the flow for larger quantities of water, said riser tube being offset from the center of the reservoir and thereby serving as a means to inhibit the maintenance of a whirlpool in the reservoir.

11. A drip coffee maker comprising a reservoir for hot water, a coffee server, a coffee basket between the source and the server, a support for said basket, a spreader in said basket, said source serving to flow hot water onto the spreader, and said support and basket being so shaped and designed as to afford overflow of excess hot water directly to the server without passing through the spreader and the coffee grounds in the basket, said spreader having a hollow handle of relatively large diameter which acts as a vent.

12. A coffee maker as defined in claim 11 in which the basket has a post rising from its bottom, with the upper end of the post nearly filling the hollow handle but leaving a thin annular vent passage between the post and handle, said passage being readily cleaned on separation of the spreader from the basket.

13. A coffee maker as defined in claim 11 in which the hollow handle is high enough to prevent overflow of coffee grounds while the hot water is passing through the coffee in the basket.

14. A coffee maker as defined in claim 11 in which the basket has a guidepost rising from its bottom, combined with an expendable filter paper disc having a center hole which fits around the guidepost as the disc is placed in the basket, the upper end of the post nearly filling the hollow handle but leaving a thin annular vent passage therebetween.

References Cited

UNITED STATES PATENTS

| | | | |
|---|---|---|---|
| 1,601,987 | 10/1926 | Topper | 99—311 X |
| 2,190,522 | 2/1940 | Pagliuco | 99—306 |
| 2,856,843 | 10/1958 | Miklas | 99—306 X |
| 3,309,980 | 3/1967 | Bozek | 99—311 X |

FOREIGN PATENTS

| | | |
|---|---|---|
| 461,972 | 12/1949 | Canada. |
| 899,274 | 8/1944 | France. |
| 1,036,425 | 4/1953 | France. |

ROBERT W. JENKINS, *Primary Examiner.*